United States Patent [19]

Baumstark

[11] Patent Number: 5,154,553
[45] Date of Patent: Oct. 13, 1992

[54] APPARATUS FOR CHAMFERING AND DEBURRING THE END EDGES OF A TOOTHED PRODUCTION GEAR

[75] Inventor: Max Baumstark, Ettlingen, Fed. Rep. of Germany

[73] Assignee: Maag Gear-Wheel & Machine Company Limited, Zurich, Switzerland

[21] Appl. No.: 460,682

[22] Filed: Jan. 4, 1990

[30] Foreign Application Priority Data

Jan. 27, 1989 [CH] Switzerland .......................... 265/89

[51] Int. Cl.⁵ .......................................... B23F 19/10
[52] U.S. Cl. .......................................... 409/8; 407/31
[58] Field of Search ............ 409/50, 8, 9, 31, 33, 409/35, 58; 51/287; 407/20, 27, 31

[56] References Cited

U.S. PATENT DOCUMENTS

| 2,174,783 | 10/1939 | Fish | 409/8 |
|---|---|---|---|
| 3,233,518 | 2/1960 | Paulger | 409/8 |
| 4,012,990 | 3/1977 | Wagner | 409/8 |
| 4,065,558 | 1/1978 | Loos | 407/31 X |
| 4,155,677 | 5/1979 | Loos | 407/27 |
| 4,290,718 | 9/1981 | Occhalini | 409/8 |
| 4,334,810 | 6/1982 | Behnke et al. | 409/8 X |

FOREIGN PATENT DOCUMENTS

| 1627376 | 10/1972 | Fed. Rep. of Germany. | |
|---|---|---|---|
| 2022937 | 8/1973 | Fed. Rep. of Germany. | |
| 2739399 | 3/1979 | Fed. Rep. of Germany. | |
| 2542372 | 8/1983 | Fed. Rep. of Germany. | |
| 8307877 | 4/1984 | Fed. Rep. of Germany. | |
| 3434507 | 9/1985 | Fed. Rep. of Germany | 409/8 |
| 3608458 | 3/1987 | Fed. Rep. of Germany. | |
| 3619537 | 3/1987 | Fed. Rep. of Germany | 409/8 |
| 2817889 | 7/1987 | Fed. Rep. of Germany. | |
| 197316 | 10/1985 | Japan | 409/8 |
| 8221 | 1/1986 | Japan | 409/8 |
| 54620 | 3/1987 | Japan | 409/8 |
| 2256670 | of 1968 | U.S.S.R. | 409/8 |
| 921728 | 4/1982 | U.S.S.R. | 409/8 |
| 787020 | 11/1957 | United Kingdom | 409/35 |
| 2046645 | 11/1980 | United Kingdom | 409/8 |

Primary Examiner—Larry I. Schwartz
Assistant Examiner—Robert Schultz
Attorney, Agent, or Firm—Bachman & LaPointe

[57] ABSTRACT

An apparatus allows for chamfering and deburring the end edges of a toothed production gear in a single operation and with one and the same tool. The tool includes two pressure wheels. Provided on each pressure wheel, axially side by side, are a ring of guide teeth and a ring of deburring teeth projecting circumferentially beyond the ring of the guide teeth. The rings have a filleted transition between them and together form chamfering teeth by means of which the end edges of the production wheels are pressed radially and axially against the production gear by means of adjusting drives.

3 Claims, 4 Drawing Sheets

APPARATUS FOR CHAMFERING AND DEBURRING THE END EDGES OF A TOOTHED PRODUCTION GEAR

FIELD OF THE INVENTION

The invention relates to an apparatus for chamfering and deburring the end edges of a toothed production gear, having a tool which comprises guide teeth and which can be displaced at least radially towards the production gear and be brought into engagement with the production gear, and comprises, at each of its two end faces, chamfering teeth which can likewise be brought into engagement with the production gear, and deburring teeth, the production gear and/or the tool having a rotary drive.

BACKGROUND ART

Gearwheels, the teeth of which have been produced by cutting, have burrs at their end edges, which have to be removed. The deburring is effected by means of a deburring tool (stripper) or, preferably, on an appropriate generating machine. Since hardened end edges can break off, the end edges are usually not only deburred but also additionally chamfered or bevelled. For this purpose, combined or separate tools for the chamfering and deburring are used on the generating machine.

An apparatus for chamfering the edges at the acute-angled end of the tooth flanks of a helical-tooth gearwheel is known from DE-PS 1627376. This apparatus comprises a guide wheel which engages in the peripherally disposed toothing of the production gear to be deburred. At each of the two sides of the guide wheel there is disposed a chamfering wheel which chamfers the edges of the teeth of the production gear at its face, by cutting and possibly by deformation. Disposed coaxially above each of these chamfering wheels is a cup-shaped deburring wheel which deburrs the production gear at the face, during which material of the production gear, which has been upset on the face during the chamfering of its end edges, is also removed if necessary. The guide wheel and the chamfering wheels are rotatably mounted on a shaft and are connected to one another for joint rotation. The cup-shaped deburring wheels are likewise mounted on this shaft and are pressed against the faces of the production gear by means of cup springs. In this known apparatus, the tool has a complicated and expensive construction consisting of five individual toothed wheels which make a very precise assembly preparation and assembly necessary. The production gear has to be machined twice on each side in order that all sides of the teeth (leading and trailing edges) may be chamfered and deburred. Either the tool has to be reversed, which is time-consuming or a second oppositely identical tool must be used which considerably increases the tool and production costs. Finally, the end edges can only be chamfered but not rounded with this known apparatus.

DE-PS 20 22 937 describes an apparatus for the chamfering or bevelling of the end edges of previously toothed gearwheels without cutting, having a guide toothed wheel which is radially displaceable towards the production gear to be worked, and where the width of the teeth of the guide wheel is smaller than that of the production gear. At each of the two sides of the guide toothed wheel, two end-edge rolling wheels are fitted for joint rotation, abutting against the ends of its teeth. The two end-edge rolling wheels have a greater tooth thickness in transverse section than the guide wheel. With this apparatus, all four end edges of a gearwheel can be chamfered in one operation. Thus deburring and chamfering are effected in the same operating cycle by inclined deformation of the four end edges of each tooth of the production gear. With this known apparatus also, the end edges can be chamfered but not rounded. The tool itself is in three parts and likewise involves heavy assembly expenditure. As in the apparatus first described, the feed movement is effected only radially. It is true that the end edges of the end-edge rolling wheels are adapted to the shape of the chamfer to be produced on the production gear teeth but this can only refer to the chamfer angle because only chamfers on the end edges of the production gear teeth can be produced with this known apparatus. Finally, the storage of this known apparatus is costly because a separate tool has to be made available for each size of production gear, shape of gear teeth etc. Only one size and one type of production gear can ever be worked with one and the same tool.

DE-PS 25 42 372 describes a tool for deburring the flanks of a production gear, which meshes with the production gear and in the course of this forces the material outwards over the end faces of the production gear with a shaping action. It is true that this known tool consists of two discs which are adjustable axially in relation to one another and can therefore be adapted to the size of production gear, but it is not in a position to deburr the end edges of the gear teeth. Separate deburring discs have to be used for the deburring. The concave flanks of the tool for the chamfering and also the deburring discs involve comparatively high production costs and lead to difficulties during the regrinding. To this must be added a limited life.

In a further development of this tool known from DE-PS 28 17 889, a deburring tool for deburring the lateral end faces of the workpiece gearwheel is disposed, in the form of two deburring discs, at each side of the tool gear-wheel and each disc acts with cutting edges on one end face of the production gear. Each deburring disc comprises a continuous circular cutting edge and a chamfer in the region thereof. With this known tool, the adjustment is again only radial and the end edges of the production gear teeth can be chamfered but not rounded. In addition, a separate tool is again necessary for each type and each size of production gear, the tool teeth can easily break off, two tool shafts are necessary (for deburring and chamfering respectively), the tool production is problematical with non-involute-shaped profiles and the tips of the teeth are not chamfered.

SUMMARY OF THE INVENTION

It is the object of the invention to provide an apparatus having the simplest possible construction and allowing to chamfer and deburr the end edges of a toothed production gear in one operation in the shortest time.

According to the invention, this problem is solved in that the tool consists of two halves which are each adjustable radially and axially against the production gear by means of an adjusting drive, and that each tool half consists of a pressure wheel on which a ring of guide teeth and a ring of deburring teeth, projecting circumferentially beyond the ring of guide teeth, are provided axially side by side, which rings of teeth have a filleted or inclined transition between them and together form the chamfering teeth by means of which the end edges of the production gear can be rounded and chamfered respectively without cutting.

In the apparatus according to the invention, in each tool half, the ring of guide teeth, the teeth of which are parallel to the axis of rotation and to the teeth of the production gear, that is to say they neither converge in a V-shape nor are made concave, forms with the filleted or inclined transition to the ring of deburring teeth, the actual chamfering teeth for the rounding and chamfering of the end edges of the tooth of the production gear without cutting. In the course of this, the two halves of the tool are fed in radially and axially by means of the adjusting drives so that after a few revolutions of the tool, the end edges have been broken by rounding or chamfering and at the same time the end faces of the production gear teeth have been deburred that is to say freed of the shaping burrs and of any secondary burrs which may have been caused by the pressure wheels. Since, during the working cycle, the ring of guide teeth, the ring of deburring teeth and the chamfering teeth formed between them operate in the same working region of the production gear practically enveloping the end edges of the production gear simultaneously, scarcely any secondary burrs occur on the flanks of the production gear. The secondary burrs which may form on the end edges are in any case removed during the deburring as explained above. In the apparatus according to the invention, the tool has a very simple construction since it consists of only two parts and the working operation is likewise very simple and short because the deburring is effected simultaneously with the rounding or chamfering. Since the chamfering of the edges is effected by a radial and axial build-up of pressure on the production gear gripped between the two halves of the tool and not as a result of a fixed distance between the axes thereof, the tool can easily be used for production gears of different thicknesses which simplifies stocking and reduces costs. Tooth profiles with a non-involute-shaped profile can likewise be worked.

One example of embodiment of the present invention is described in more detail below with reference to the drawings, wherein

DETAILED DESCRIPTION OF THE PREFERRED EMBODIMENT(S)

Figure 1:
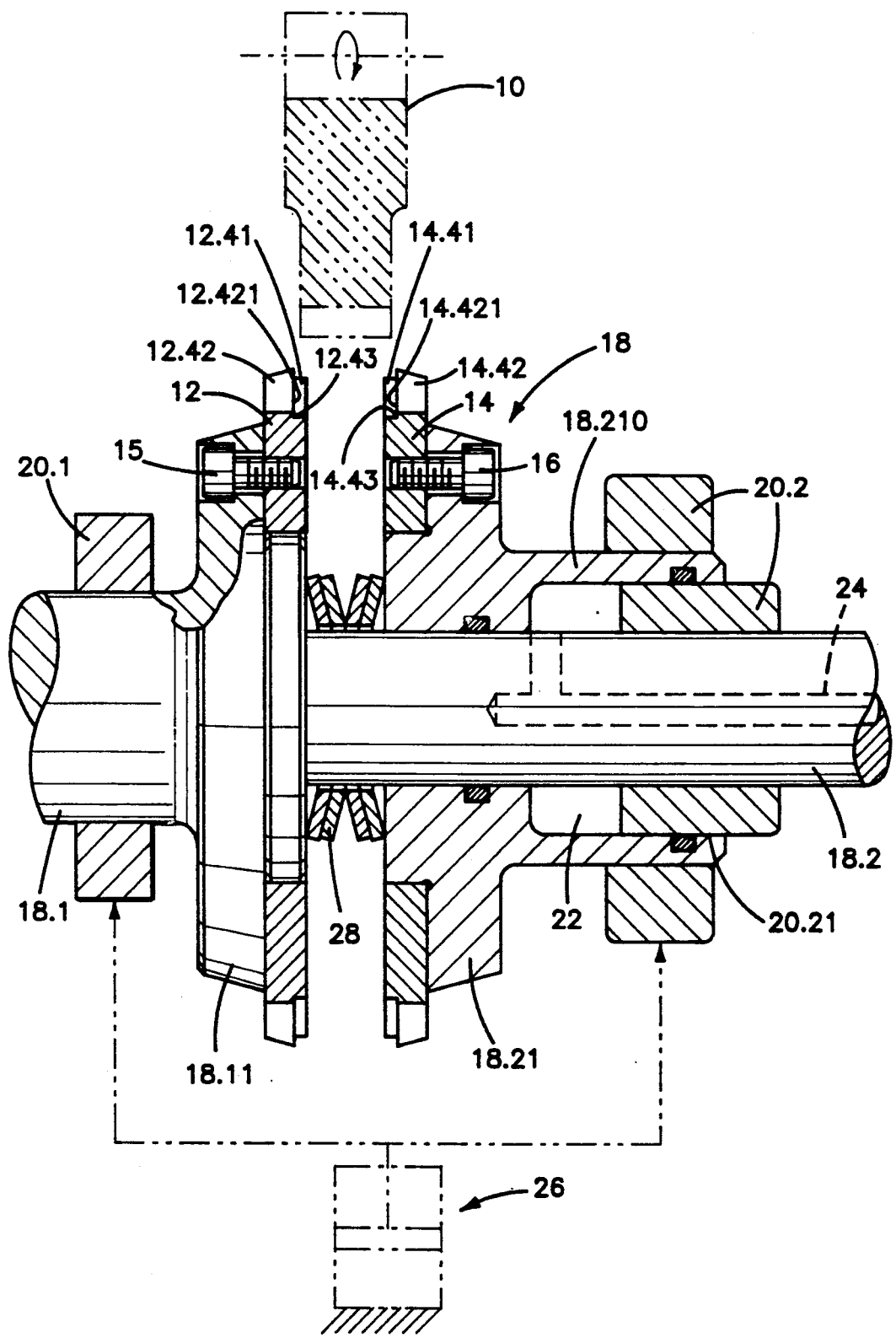
FIGS. 1-3 show the construction of the apparatus according to the present invention which is illustrated in three different positions in order to explain its mode of operation.

The apparatus described below for chamfering and deburring the end edges of a toothed production gear 10, consists of two pressure wheels 12,14. Since both pressure wheels 12,14 have the same construction, only the pressure wheel 12 illustrated in FIGS. 4 and 5 will be described in detail below.

The pressure wheel 12 comprises a disc-like body 12.1 which has a central mounting hole 12.2 and some tapped holes 12.3 for securing it to a tool holder described further below. The disc-like body 12.1 has, at its circumferential edge, a multi-part profiling 12.4 which consists of a ring of guide teeth 12.41 and a ring of deburring teeth 12.42 which latter is disposed towards the outside, that is to say at the side of the ring of guide teeth 12.41 further from the production gear 10. The ring of guide teeth 12.41 has a profile mating to the profile of the production gear 10 to be worked by the pressure wheel 12. The axially adjacent ring of deburring teeth 12.42 projects beyond the ring of guide teeth along the whole outer circumference thereof. The extent to which the ring of deburring teeth 12.42 projects beyond the ring of guide teeth 12.41 is the narrow region B in FIG. 4 between the two outlines of the ring of guide teeth 12.41 and of the ring of deburring teeth 12.42. In the whole region B, the ring of guide teeth 12.41 and the ring of deburring teeth 12.42 have a transition in the form of a fillet (FIG. 5b) or in the form of a slope (FIG. 5c) and together form chamfering teeth 12.43 at this transition. By means of the chamfering teeth 12.43, the burred end edges of the production gear 10, the profiling of which corresponds to the profiling 12.4, are rounded (with the filleted transition according to FIG. 5b) or chamfered (with the inclined transition according to FIG. 5c), by deformation effected under pressure. The ring of deburring teeth 12.42 has sharp cutting edges 12.421 which remove every burr on the end faces of the teeth of the production gear 10. The pressure wheels 12,14 are made in one piece, that is to say the ring of guide teeth 12.41, the ring of deburring teeth 12.42 and the chamfering teeth 12.43 are formed on each pressure wheel.

Figure 4:
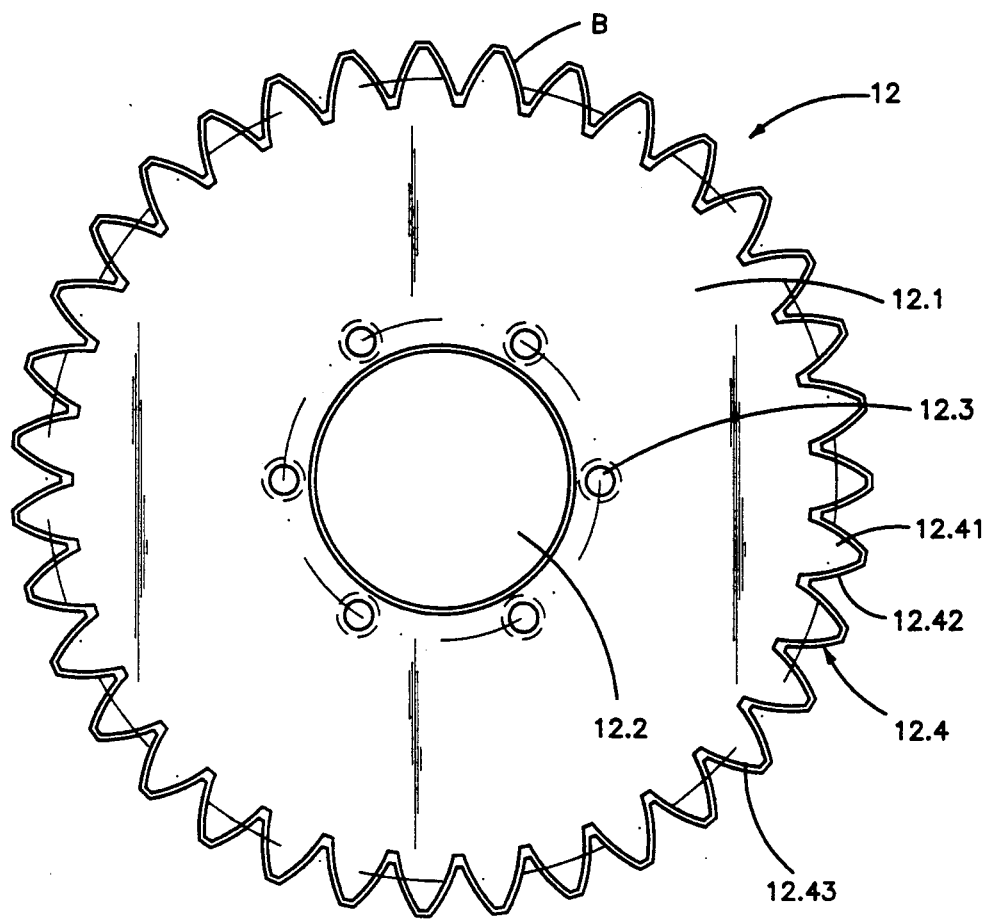
FIG. 4 shows, in plan view, the working side of one half of the tool of the apparatus according to the invention.
Figure 5A:
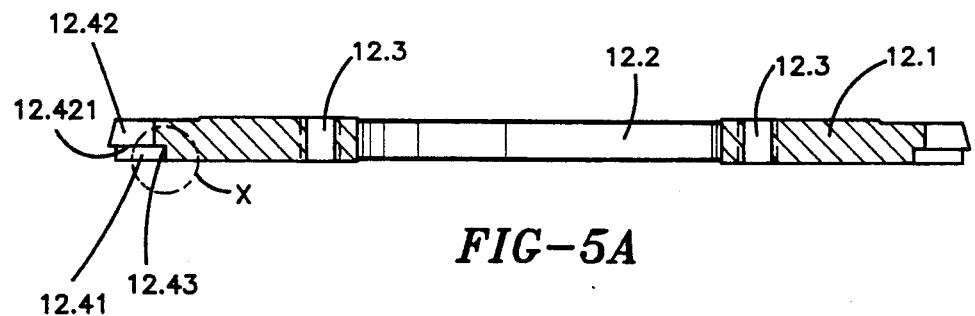
FIG. 5a shows the tool half of FIG. 4 in cross-section.
Figure 5B:
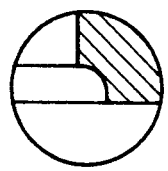
FIGS. 5b and 5c show an enlarged illustration of a detail X from FIG. 5a for chamfering teeth constructed in two different ways.
Figure 5C:
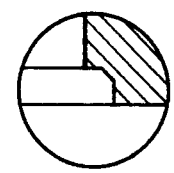

It can easily be seen from the illustration in FIG. 4 that the teeth of the ring of deburring teeth 12.42 are axially in alignment with the teeth of the ring of guide teeth 12.41 and project beyond these in thickness and in height. Instead of the ring of deburring teeth, a deburring disc with a circumferential cutting edge and a lead-in surface could be provided on the pressure wheels 12,14; these are known from DE-PS 28 17 889 mentioned at the beginning and are therefore not illustrated or described in detail here. The form of embodiment here illustrated in FIG. 4, which comprises two rings of teeth 12.41,12.42 which are axially in alignment, is preferred.

The construction and mode of operation of the apparatus according to the invention will be described in more detail with reference to FIGS. 1 to 3. According to FIG. 1, the pressure wheels 12,14 are secured to a tool holder, which is designated as a whole by 18, by means of screws 15 and 16 respectively. The tool holder 18 comprises two shafts 18.1,18.2 which are mounted for rotation in bearing 20.1 and 20.2 respectively of the tool holder 18. The pressure wheels 12,14 are secured to hubs 18.11 and 18.21 respectively by means of the screws 15 and 16 respectively engaging in the tapped holes 12.3 in the manner illustrated. The shafts 18.1 and 18.2 are made in one piece and are axially displaceable in the bearings 20.1 and 20.2. The hub 18.21 has, at the side remote from the pressure wheel 14, an annular flange 18.210 which is axially displaceable in a bore 20.21 in the bearing 20.2. Hydraulic oil can be introduced into a hydraulic chamber 22 through a bore 24 formed in the shaft 18.2. The chamber 22 and the bore 24 are part of an axial adjusting drive which is not further illustrated. The tool holder can be adjusted radially with respect to the production gear 10 by means of a radial adjusting drive 26 illustrated in a simplified manner. Disposed between the hubs 18.11 and 18.21 is a spring device 28 in the form of cup springs which, when the axial adjusting drive 22,24 is not actuated, hold the hubs 18.11 and 18.21 at a distance apart which is at least equal to the width of the ring of teeth of the production gear 10. For reasons of simplification, the radial adjusting drive 26 has been illustrated only in FIG. 1 and not in FIGS. 2 and 3.

The present invention apparatus works as follows:

In the state shown in FIG. 1, the production gear 10 has been received on a machine and is already in rotation. The tool consisting of the pressure wheels 12,14 is still in the rest position.

Figure 2:
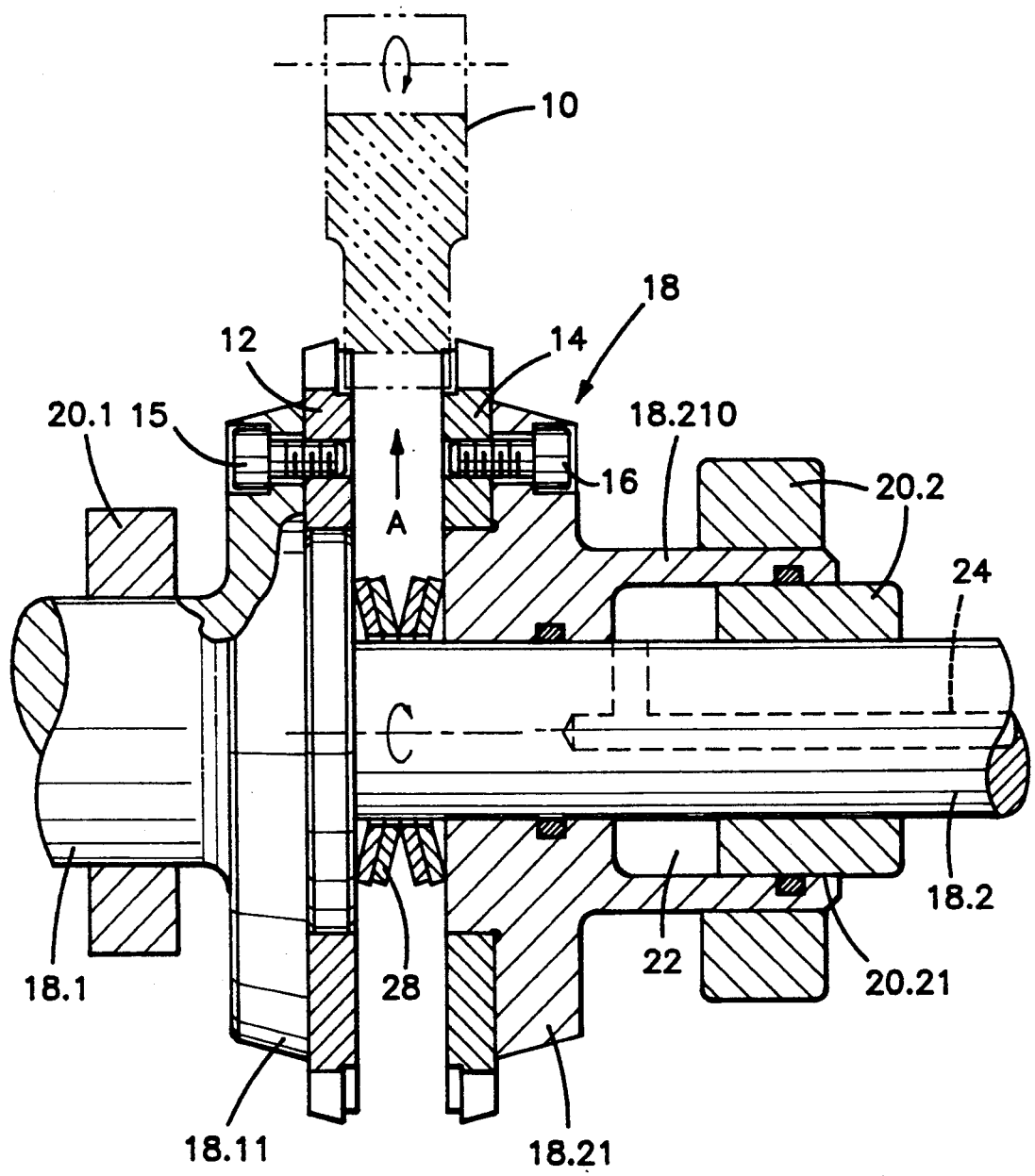

In the state shown in FIG. 2, the tool 12,14 has been fed in, in the direction of an arrow A and is now being driven by the production gear 10.

Figure 3:
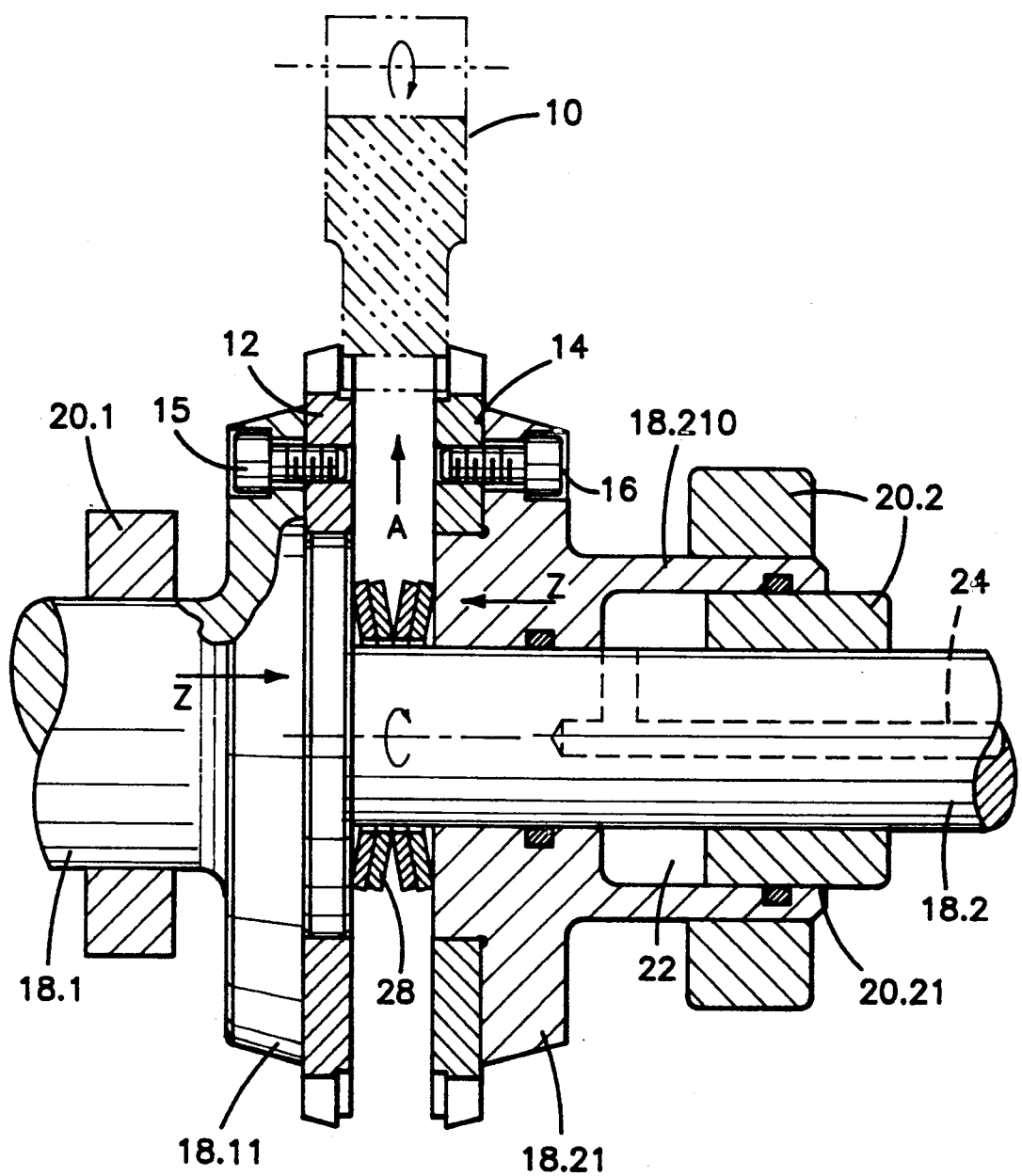

In the state shown in FIG. 3, the two pressure wheels 12,14 are pressed together in the direction of the arrows Z by means of the axial adjusting drive 22,24 through the introduction of hydraulic power into the chamber 22. The force in the direction of the arrow A, which is exerted by the radial adjusting drive 26, continues to act in the direction of the production gear 10. After a few revolutions, the pressure operation is finished. The end edges of the teeth of the production gear 10 are then chamfered and deburred.

If secondary burrs are produced at the ends of the teeth of the production gear during the pressure operation, these are removed by the cutting edges of the pressure wheels. Should secondary burrs also form on the flanks, which experience has shown is not the case, these are removed during the fine finish-machining of the flanks of the production gear (which is carried out in any case for example in gearwheels for car gearboxes), by lapping, shaving or the like.

The shaping burrs or the like which are present on the end edges of the production gear 10, are forced outwards by the pressure wheels 12,14 during the rounding of the end edges in the method described above. Then when the distance of the cutting edges of the rings of deburring teeth has been reduced to the amount of the width of the production gear, the burrs (and if necessary the secondary burrs) are removed by the cutting edges.

The apparatus described above thus renders possible the rounding and deburring of the end edges of the teeth of a production gear in one operation and with one and the same tool.

I claim:

1. An apparatus for chamfering and deburring the end edges of a toothed production gear comprising a tool having two halves; first means for displacing said tool radially towards the production gear; second means for driving in a rotary manner at least one of said production gear and said tool; third means for adjusting each of said halves of said tool axially against the production gear; and each of said tool halves has an opposing face provided with a pressure wheel on which a ring of guide teeth and a ring of deburring teeth are mounted side by side such that said ring of deburring teeth projects circumferentially beyond said ring of guide teeth, wherein said rings of teeth have an inclined transition between them and together form chamfering teeth by means of which the end edges of the production gear can be chamfered without cutting.

2. An apparatus according to claim 1, wherein the pressure wheels are mounted conformally with the production gear and coaxially on two shafts and can be pressed, by said third means against the production gear, and wherein a spring device provided between the pressure wheels holds the pressure wheels spaced apart when said third means is not actuated.

3. An apparatus according to claim 1, wherein the pressure wheels are mounted conformably with the production gear and coaxially on two shafts and can be pressed, by said third means against the production gear, and wherein a spring device provided between the pressure wheels holds the pressure wheels spaced apart when said third means is not actuated.

* * * * *